United States Patent [19]

Tsao

[11] Patent Number: 5,290,534
[45] Date of Patent: Mar. 1, 1994

[54] METHOD FOR REMOVING ORGANIC RESIDUE FROM AS-SYNTHESIZED ZSM-18

[75] Inventor: Ying-Yen P. Tsao, Lahaska, Pa.

[73] Assignee: Mobil Oil Corporation, Fairfax, Va.

[21] Appl. No.: 973,510

[22] Filed: Nov. 9, 1992

[51] Int. Cl.$^5$ .................. C01B 33/34; B01J 29/32
[52] U.S. Cl. .................. 423/704; 423/706; 423/713; 502/74; 502/77
[58] Field of Search .......... 423/704, 713, 706; 502/71, 74, 77, 85

[56] References Cited

U.S. PATENT DOCUMENTS

| | | | |
|---|---|---|---|
| 2,882,243 | 4/1959 | Milton | 252/455 |
| 2,882,244 | 4/1959 | Milton | 252/455 |
| 3,130,007 | 4/1964 | Breck | 23/113 |
| 3,247,195 | 4/1966 | Kerr | 260/242 |
| 3,314,752 | 4/1967 | Kerr | 23/113 |
| 3,322,690 | 5/1967 | Bilisoly | 423/713 |
| 3,702,886 | 11/1972 | Argauer et al. | 423/328 |
| 3,709,979 | 1/1973 | Chu | 423/328 |
| 3,832,449 | 8/1974 | Rosinski et al. | 423/328 |
| 3,950,496 | 4/1976 | Ciric | 423/328 |

FOREIGN PATENT DOCUMENTS

| | | | |
|---|---|---|---|
| 0271264 | 6/1988 | European Pat. Off. | 502/74 |
| 2831611 | 2/1980 | Fed. Rep. of Germany | 502/77 |
| 0978261 | 12/1964 | United Kingdom | 502/74 |

*Primary Examiner*—Carl F. Dees
*Attorney, Agent, or Firm*—Alexander J. McKillop; George W. Hager, Jr.; Charles A. Malone

[57] ABSTRACT

An improved method for removing organic residue from ZSM-18 which can be used during zeolite synthesis or with an as-synthesized ZSM-18. When used during synthesis, a minute amount of noble metal is incorporated into the ZSM-18. Alternatively, a noble metal-containing precursor is impregnated onto as-synthesized ZSM-18. Thereafter, ZSM-18 united with the noble metal is reduced in hydrogen at 200° C. for about 1 hour. Next, ZSM-18 united with the noble metal is calcined at 300° C. for 10-24 hours, and subsequently at 500° C. for 1-3 hours thereby producing a ZSM-18 material that is free of organic residue.

19 Claims, No Drawings

METHOD FOR REMOVING ORGANIC RESIDUE FROM AS-SYNTHESIZED ZSM-18

FIELD OF THE INVENTION

This invention relates to methods for removing a residual organic directing agent from zeolites.

BACKGROUND

Zeolite materials, both natural and synthetic, have been demonstrated in the past to have catalytic properties for various types of hydrocarbon conversion. Certain zeolitic materials are ordered, porous crystalline aluminosilicates having a definite crystalline structure as determined by x-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of large dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as rigid three-dimensional frameworks of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This balanced electrovalence can be expressed by a formula wherein the ratio of aluminum to the number of various cations, such as Ca/2, Sr/2, Na, K or Li is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. These zeolites have come to be designated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,970); and zeolite ZSM-12 (U.S. Pat. No. 3,832,449), merely to name a few.

Although the term, zeolites, encompasses materials containing silica and alumina, it is recognized that the silica and alumina portions may be replaced in whole or in part with other oxides. More particularly, $GeO_2$ is an art recognized substitute for $SiO_2$ Also, $B_2O_3$, $Cr_2O_3$, $Fe_2O_3$, and $Ga_2O_3$ are art recognized replacements for $Al_2O_3$. Accordingly, the term zeolite as used herein shall connote not only materials containing silicon and, optionally, aluminum atoms in the crystalline lattice structure thereof, but also materials which contain suitable replacement atoms for such silicon and/or aluminum. On the other hand, the term aluminosilicate zeolite as used herein shall define zeolite materials consisting essentially of silicon and aluminum atoms in the crystalline lattice structure thereof, as opposed to materials which contain substantial amounts of suitable replacement atoms for such silicon and/or aluminum.

Although certain zeolites can be prepared from totally inorganic reaction mixtures, the synthesis of other zeolites is often promoted or made possible by the inclusion of certain organic compounds, termed organic directing agents, in the reaction mixture. Note the article by Lok et al., entitled "The Role of Organic Molecules in Molecular Sieve Synthesis" appearing in *Zeolites*, Vol. 3, pp. 282-291 October, (1983). When such organic directing agents are used, they may be included in an aqueous reaction mixture containing reactants, e.g., sources of silica and alumina, necessary for the zeolite synthesis.

The reaction mixture may then be maintained under sufficient conditions, e.g., at elevated temperature, until the desired crystals are formed. These crystals may then be recovered by filtration and washing the filtered crystals with water. This filtering and washing treatment separates the crystals from organic directing agent which is either included in the mother liquor of the reaction mixture or loosely associated with the exterior surface of the crystals. However, a residue of the organic directing agent, e.g., amines and especially quaternary ammonium compounds, usually remains more tenaciously attached to the zeolite crystals.

This tenaciously attached residue, which is not removed by the filtering and washing treatment, may be occluded within the pores of the zeolite and/or firmly affixed to the surface of the zeolite. Certain residues which are tenaciously attached to the zeolite may occupy cation exchange sites of the zeolite, especially in the case of quaternary ammonium residues It is particularly important to remove organic residue which occluded in the pores of the zeolite, because this type of residue may constitute obstructions which tend to substantially reduce the sorption capacity and catalytic activity of the zeolite.

In order to remove the residue of organic directing agents from as-synthesized zeolites, which residue cannot be readily removed by filtration and washing, the zeolite may be calcined at elevated temperatures, e.g., 400° C. or greater, e.g., in the presence of a source of oxygen such as air, for, e.g., at least one hour. This calcination treatment promotes the decomposition and/or volatilization of the residue. The presence of oxygen during the calcination further promotes oxidation, e.g., combustion, of the organic residue into oxidized species, e.g., carbon dioxide, carbon monoxide, water, and nitrogen oxides, which are evolved as gasses.

The above-mentioned calcination procedure is effective for removing organic directing agent residue from as-synthesized zeolites which are stable under the required conditions. However, certain as-synthesized zeolites tend to undergo a phase transformation, e.g., to a different crystalline form or to an amorphous material, under these conditions. One such zeolite is ZSM-18, especially species of ZSM-18 which have a low silica to alumina molar ratio. U.S. Pat. No. 3,950,496 issued to Ciric, the entire disclosure of which is expressly incorporated herein by reference, describes ZSM-18 and the synthesis thereof. Example 6 of this Ciric patent points out that when the as-synthesized form of ZSM-18, prepared from a reaction mixture having a silica to alumina molar ratio of 9.0, was calcined at 1,000° F. in air for 3 hours, the zeolite was substantially reduced to the amorphous state.

Ryan in U.S. Pat. No. 4,851,200 which issued on Jul. 25, 1989, disclosed a three-step method for removing a residue of an organic directing agent from as-synthesized ZSM-18 zeolites. The first step involved contacting as-synthesized zeolite with an aqueous solution of an ammonium fluorosilicate. In the second step, the zeolite is ion-exchanged with an alkali metal or alkaline earth metal salt. During the third step, the ion-exchanged zeolite is air calcined while co-feeding ammonia. These steps are repeated at least once.

Therefore, what is needed is a simple method to remove an organic residue from ZSM-18 which does not require a repetition of the process steps and where a noxious ammonia gas is not co-fed during air calcination.

SUMMARY OF THE INVENTION

According to one aspect of this invention, there is provided a method for removing organic material blocking pores of an as-synthesized zeolite, said as-synthesized zeolite having been previously produced or synthesized in the presence of an organic directing agent without utilization of the instant invention. The organic material is a residue of said organic directing agent which remains in the as-synthesized zeolite after it is separated from the mother liquor of the reaction mixture used to prepare said as-synthesized zeolite.

In one embodiment of this invention, during the first step, a noble metal-containing precursor is impregnated onto as-synthesized ZSM-18. Impregnation is obtained by either a spray drying technique or by a soaking technique. In either technique, a minute amount of the noble metal is impregnated onto the as-synthesized ZSM-18. An aqueous solution of tetraamineplatinum hydroxide containing sufficient platinum to impregnate about 0.10 weight % of platinum onto the as-synthesized ZSM-18 is preferred. After placing an aqueous solution of a noble metal-containing precursor (e.g. tetraamineplatinum hydroxide) by either technique onto as-synthesized ZSM-18, it is then heated for a time sufficient to remove water from the as-synthesized ZSM-18. This time can vary from about 2 to about 12 hours or more as required for drying.

In another embodiment, a noble metal precursor as mentioned above is placed into a reactor during the production or synthesis of ZSM-18. Although the exact mechanism is not known, it is believed that after synthesis, substantially all of the noble metal e.g. platinum, obtained from the precursor remains on the outside of the synthesized ZSM-18 since the organic residue resultant from the directing agent prevents most of said precursor from entering openings of the synthesized ZSM-18. It is believed that some of the precursor is occluded within pores of the ZSM-18.

Thereafter, as-synthesized or synthesized ZSM-18 with the noble metal thereon and containing the organic residue, after drying, is contacted with hydrogen at a temperature of about 200° C. in an amount and for a time sufficient to reduce the noble metal precursor to its free metal state. Once the noble metal has been reduced to its free metal state, it is calcined in air at 300° C. for about 10 to about 24 hours. Subsequently, said as-synthesized or synthesized ZSM-18 is calcined again at a temperature of about 500° C. for about 1 to 3 hours. After calcination, the resultant ZSM-18 material is free of organic residue and exhibits excellent XRD crystallinity along with good hexane absorption capacity.

It is therefore an object of this invention to remove an organic residue or directing agent from as-synthesized or synthesized ZSM-18 while maintaining its crystallinity.

It is another object of this invention to remove an organic residue or directing agent from as-synthesized or synthesized ZSM-18 while maintaining its activity.

It is a further object of this invention to provide for a safe and efficient method for removing an organic residue or directing agent from as-synthesized or synthesized ZSM-18.

It is a yet further object of this invention to remove an organic residue or directing agent from as-synthesized or synthesized ZSM-18 while maintaining its sorptive capacity.

BRIEF DESCRIPTION OF THE PREFERRED EMBODIMENTS

There is provided a method for removing organic material blocking the pores of a zeolite. It is possible to determine whether organic material is blocking pores of a zeolite (e.g., by being occluded in the framework of a zeolite) by conducting an elemental analysis for carbon along with measuring the sorption capacity of the zeolite for molecules such as water, n-hexane and cyclohexane. The presence of significant amounts of carbon in the zeolite confirms that organic material is associated with the zeolite. A sorption capacity less than expected for the zeolite confirms that the organic material is blocking pores of the zeolite, thereby restricting access of sorbant molecules into the internal pore structure of the zeolite. The presence of organic material in the zeolite is also indicated when the zeolite darkens (e.g., turns grey or black) upon calcination. This darkening is associated with organic material turning into coke upon such calcination.

The organic material, which is to be removed from zeolites in accordance with methods of the present invention, is a residue of organic directing agent which is used to prepare the zeolite. The molecules of this residue may be the same or different from the molecules of the organic residue. For example, when the organic directing agent is a neutrally charged amine of sufficiently small size, entire molecules of the amine may be occluded within the internal framework of the as-synthesized zeolite. However, when a quaternary ammonium directing agent is used, cation portions thereof may be occluded within the framework by occupying cation exchange sites of the zeolite. Decomposition products of the organic directing agent may also be occluded within the framework of the as-synthesized form of the zeolite. It is generally observed that, whenever an organic directing agent is used to prepare a zeolite, a residue of the directing agent will remain affixed to the zeolite, which residue cannot be removed by separation of the mother liquor of the reaction mixture from the zeolite by mere filtration and washing of the zeolite crystals.

The residue of organic directing agents can be effectively removed from many zeolites by a simple calcination procedure. However, other zeolites tend to undergo a phase transformation under such calcination conditions. One such zeolite is ZSM-18, particularly forms of ZSM-18 having a relatively low silica to alumina molar ratio of e.g., 10 or less.

In the practice of this invention, one embodiment of the first step is directed to the placement of a noble metal precursor into a reactor when making ZSM-18. In making zeolite ZSM-18, the usual method comprises reacting, in an an aqueous media, sodium aluminate or an amorphous sodium aluminosilicate gel with a solution prepared by addition of colloidal silica to a solution of tris-quaternary ammonium hydroxide. The reaction is carried out in a suitable vessel made, for example, of metal or glass and capable of closure to prevent loss of water. The reaction mixture is initially continuously or periodically stirred to insure homogeneity. After this mixing, agitation may be stopped as it is unnecessary to agitate the reaction mass during the formation and crystallization of the zeolite, although mixing during such latter stages has not been found to be detrimental.

The preferred noble metal precursor for use herein is tetraamineplatinum hydroxide. The amount utilized will be enough sufficient to incorporate a minute amount of the platinum into ZSM-18, generally this will be up to about 0.20 wt % of the platinum. Although platinum is preferred, other noble metals can be used. These include palladium, rhodium, and iridium. Precursors for these other noble metals are $Pd(NH_3)_4Cl_2$, rhodium acetate, and pentaaminechloroiridium (iii) dichloride. When utilized these precursors should contain sufficient noble metal to deposit up to about 0.20 weight % of the metal into ZSM-18. Additional steps for the completion of ZSM-18 synthesis are disclosed in U.S. Pat. No. 3,950,496 which issued Ciric on Apr. 13, 1976. This patent is hereby incorporated herein by reference. Once the synthesis of ZSM-18 with the platinum therein is finished, it is conditioned in a manner similar to the as-synthesized ZSM-18 below to remove the organic residue or directing agent therefrom.

In another embodiment, during the first step, organic residue can be removed from as-synthesized ZSM-18 by either spraying or soaking a noble metal precursor onto ZSM-18. The concentration of the aqueous noble metal precursor for either spraying or soaking is similar to the concentration above which is used during placement of a noble metal into ZSM-18 during synthesis. When the aqueous noble metal precursor is sprayed onto ZSM-18, spraying should continue until sufficient precursor has been placed on the ZSM-18 to obtain a noble metal deposition after heating and calcining so as to be in an amount of from about 0.01 to about 0.20 while 0.10 weight % is preferred. Substantially all of the aqueous noble metal precursor placed on ZSM-18 by either of the first step embodiments remains on the outside of the ZSM-18 (synthesized or as-synthesized ZSM-18) since the organic residue or directing agent resultant from synthesizing ZSM-18 remains therein thereby preventing most of the precursor from entering into the ZSM-18.

Sprays and methods for spraying which can be used to spray an aqueous solution of a noble metal precursor onto ZSM-18 are discussed in the *Encyclopedia Of Chemical Technology*, Third Edition, Vol. 21, pp 466–483, by Kirk-Othmer which is incorporated herein by reference.

If it is desired to soak ZSM-18, sufficient aqueous noble metal precursor should be utilized to make a slurry of the ZSM-18 material. This ZSM-18 material should be allowed to soak from about 2 to about 16 hours. Generally, about 2 hours is preferred when the temperature of ZSM-18 is about 80° C. When the ZSM-18 is cooler, longer soak times should be used.

ZSM-18 material from either of the first step embodiments above is dried to remove water from the ZSM-18 resultant from placement of the aqueous noble metal precursor thereon. For drying purposes, a rotary evaporator can be used. Of course other methods can be used as is known to those skilled in the art. Drying should continue for a time and at a temperature sufficient to remove water from the ZSM-18. As is preferred, the drying time will be from about 2 to about 12 hours and the temperature should be from about 100° to about 125° C.

After the ZSM-18 has been dried, it is subjected to a reducing step. During this step, as-synthesized or synthesized ZSM-18 with the noble metal precursor thereon and containing the organic residue, after drying, is contacted with a sufficient amount of hydrogen at a temperature of about 175° to about 225° C. and for a time sufficient to reduce the noble metal precursor to its free metal state. Once the noble metal has been reduced to its free metal state, the ZSM-18 material is calcined in air at a temperature of about 275° to about 325° C. for about 10 to about 24 hours. Subsequently, said as-synthesized or synthesized ZSM-18 is calcined again at a temperature of about 450° C. to about 550° C. in air for about 1 to 7 hours. After calcination, the resultant ZSM-18 material is free of organic residue or directing agent and exhibits excellent XRD crystallinity along with good hexane absorption capacity.

Methods of the present application may be particularly useful in preparing a stable hydrogen form of ZSM-18 which is essentially free of residual organic directing agent (e.g., coke). ZSM-18 which is essentially free of residual organic directing agent may be light in coloration. The carbon analysis of this hydrogen form of ZSM-18 will be much smaller, e.g., 5 percent by weight or less, than the as-synthesized ZSM-18.

As pointed out in the aforementioned U.S. Pat. No. No. 3,950,496, ZSM-18 may be prepared with a directing agent by the name of 1,3,4,6,7,9-hexahydro-2,2,5,5,8,8-hexamethyl-2H-benzo (1,2,-C:-3,4-C':5,6-C'') tripyrolium trihydroxide. Another name for this particular compound, which is used in the Examples appearing hereinafter, is tris-quaternary ammonium hydroxide.

COMPARATIVE EXAMPLE A

Tris-quaternary ammonium hydroxide was prepared as described in U.S. Pat. No. 3,950,496. This template was used to prepare ZSM-18 as outlined in the same patent, Example 3 and restated here.

| | |
|---|---|
| $H_2O$: | 210.8 g |
| Tris-quaternary ammonium hydroxide (1/2N): | 225.1 g |
| $NaAlO_2$: | 10.5 g |
| Tetramethyl-orthosilicate: | 102.6 g |

The $NaAlO_2$ was dissolved in the $H_2O$ and tris-quaternary ammonium hydroxide. The tetramethylorthosilicate was added to this vigorously stirring solution resulting in a stiff gel after approximately two minutes. This gel was transferred to a 1 liter autoclave and heated to 125° C., with stirring at 300 RPMS for 18 days. The product was 100% ZSM-18, identified by its X-ray diffraction pattern. This ZSM-18 product was filtered, washed with distilled water, and dried at 80° to 90° C.

An X-ray diffraction (XRD) method for determining the X-ray diffraction pattern of ZSM-18 is mentioned in U.S. Patent No. 3,950,496. Identification of ZSM-18 by its X-ray diffraction pattern is also disclosed in U.S. Pat. No. 4,851,200. These patents are incorporated herein by reference. Determination of the framework topology of ZSM-18 with XRD is additionally discussed in an article by S. L. Lawton and W. J. Rohrbaugh. This article appeared in *Science*, 247, 1319–1322 (1990), and is entitled, "The Framework Topology of ZSM-18, A Novel Zeolite Containing Rings of Three (Si, Al)-0 Species."

The absorption capacity of n-hexane for calcined ZSM-18 at 90° C. is 16 wt. %; cyclohexane absorption is about 19 wt. %; and water absorption is about 25 wt. %.

A hydrogen form of a mixture predominating in ZSM-18 has been tested for the catalytic cracking of normal hexane by means of an Alpha test and found to have an Alpha Value of 20, as disclosed in U.S. Pat. No. 3,950,496. When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant = 0.016 sec $^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

Tests were conducted on a series of treatments applied to as-synthesized and synthesized ZSM-18 materials.

COMPARATIVE EXAMPLE B

A sample of as-synthesized ZSM-18 having a Si/Al$_2$ ratio of 13.2 which lacked the incorporation of a noble metal therein was not treated and examined. Upon examination, this untreated ZSM-18 was pale yellow in color. Upon analysis, carbon was found to be present in an amount of 14.92 wt. %. XRD crystallinity was excellent and the n-hexane capacity was negligible. These examinations indicated that organic residue or directing agent was present in the ZSM-18 and that the n-hexane could not enter the ZSM-18.

EXAMPLE 1

A sample as used in Example B was heated to 200° C. in the presence of hydrogen for about 1 hour. The hydrogen flow rate was 60 cc/min/g catalyst. Thereafter, the sample was calcined for 16 hours at a temperature of 300° C. The sample was next heated in air for about 1.3 hours at a temperature of about 500° C. An examination indicated that the ZSM-18 was dark brown in color. Carbon was found to be present in an amount of 4.09 wt. %. XRD crystallinity was excellent which indicated that the pore structure of ZSM-18 had been substantially retained. The absorption of n-hexane at 90° C. was 11.9 wt. % which indicated that the treatment had removed some of the organic residue from the pores of the ZSM-18 even without impregnation of a noble metal. After cooling, it was again heated to a temperature of about 500° C. in air for 1.7 hours. The resultant sample exhibited excellent crystallinity. However, it became dark yellow in color, indicating incomplete removal of organic residue. After cooling, it was again heated to a temperature of about 500° C. in air for 3 hours. It then became pale yellow in color indicating further removal of organic residue. However, this sample showed substantial XRD crystallinity loss.

EXAMPLE 2

As-synthesized ZSM-18 having a Si/Al$_2$ ratio of 13.2 was impregnated with 0.1 wt. % of Ni by soaking the ZSM-18 with an aqueous solution containing 0.5 wt. %. of Ni(NO$_3$)$_2$.6H$_2$O for about 3 hours. Afterwards, the soaked ZSM-18 was reduced with hydrogen at 200° C. for about 1 hour. Thereafter, the ZSM-18 was calcined in air at 300° C. for 16 hours. Next, it was calcined in air at 500° C. for 1.3 hours. After this treatment, the ZSM-18 was examined.

Upon examination, it was determined that the ZSM-18 had a dark brown color which indicated that substantial amounts of the organic residue remained. XRD crystallinity was excellent which indicated that the structure of ZSM-18 had been substantially retained. Lack of sufficient sample prevented other tests from being run.

EXAMPLE 3

As-synthesized ZSM-18 having a Si/Al$_2$ ratio of 13.2 was impregnated with 0.1 wt. % Pt by soaking the ZSM-18 with 1.02 mol of tetraamineplatinum hydroxide, a platinum metal-containing precursor, in water. It was then treated as in Example 2. It was then examined after treatment.

Upon examination, it was determined that the ZSM-18 was pale yellow in color. Carbon was found to be present in a minute amount of 0.115 wt. %. XRD crystallinity was excellent. After examination, it was again heated to a temperature of about 500° C. in air for 1.7 hours. An examination revealed that the ZSM-18 was white in color which indicated that substantially all of the organic residue had been removed. A carbon analysis of 0.110 wt. % confirmed the fact that substantially all of the organic residue had been removed. The structure of the ZSM-18 was substantially retained as indicated by its XRD crystallinity rating of "excellent".

EXAMPLE 4

A ZSM-18 was synthesized as in Comparative Example A except, prior to transferring the gel to a 1 liter autoclave, 0.1 gram of tetraamineplatinum hydroxide was added to the gel. The gel was then heated to 135° C., with stirring at 150 RPMS for 95 days. The product was 100% ZSM-18, identified by its X-ray diffraction pattern. The ZSM-18 product was filtered, washed with distilled water, and dried at 80° to 90° C. This light brown product was analyzed and determined to have 17.22% by weight of carbon.

Afterwards, the dried ZSM-18 with sufficient tetraamineplatinum hydroxide thereon to have 0.1 wt. % of platinum occluded onto the ZSM-18 is heated to 200° C. in the presence of hydrogen for 1 hour. The hydrogen is contacted with the ZSM-18 at a rate of 60 cc/min/g catalyst to reduce the tetraamineplatinum hydroxide to platinum metal. Thereafter, ZSM-18 with 0.1 wt. % of platinum occluded thereon is calcined for 16 hours at a temperature of about 300° C. Subsequently, the ZSM-18 is heated in air for 1.3 hours at a temperature of about 500° C. After cooling, it was again heated to a temperature of about 500° C. in air for 1.7 hours.

Upon examination, ZSM-18 was white in color indicating substantial removal of the organic residue or directing agent. The removal of the organic residue was confirmed by a carbon analysis which indicated the presence of 0.055 wt. % of carbon. XRD crystallinity of ZSM-18 was rated as excellent which was indicative of the ZSM-18 having substantially retained its pore structure.

Sorption capacities for the ZSM-18 described in this example are:

| | |
|---|---|
| Normal hexane: | 14.0% @ 90° C. |
| Normal hexane: | 18.5% @ 25° C. |
| Cyclohexane: | 21.2% @ 25° C. |
| Water: | 26.9% @ 25° C. |

The Alpha test shows an ammonium exchanged form of this zeolite having an Alpha value of 386.

EXAMPLE 5

A synthesized sample of ZSM-18 was prepared as in Example 4. After preparation, it was dried with sufficient tetramineplatinum hydroxide thereon to have 0.1 wt. % of platinum occluded onto the ZSM-18. It was not contacted with hydrogen.

The dried sample was heated in the presence of nitrogen at a temperature of 130° C. for 3 hours. Next, it was heated for 2 hours in the presence of nitrogen containing 5 vol. % of oxygen at a temperature of 250° C. This second step of heating was repeated two more times.

After this the temperature was increased to 400° C. and the ZSM-18 was contacted with nitrogen containing 5 vol. % of oxygen for 2 hours. Subsequently, the ZSM-18 was heated to a temperature of 450° C. in air for 2 hours. It was then cooled and analyzed. An analysis revealed that the color was brown which was indicative of the presence of substantial carbon. XRD crystallinity was rated as good. Its n-hexane absorption capacity at 90° C. was rated at 8.7%.

The temperature was increased to 500° C. while contacting the ZSM-18 with air for 3 hours. After cooling the sample was analyzed. An analysis revealed that the ZSM-18 was white in color which indicated that substantially no carbon was present and that substantially all of the organic residue had been removed. However, its XRD crystallinity was rated as poor which indicated that its crystalline latice structure had been substantially destroyed. Its n-hexane absorption capacity was not measured.

As demonstrated by the above examples, organic residue or directing agent can be effectively removed when this method is utilized. Utilization of this method allows organic residue to be removed from ZSM-18 as-synthesized or in its synthesized form without suffering crystallinity loss. Utilization of this method will enable sufficient amounts of calcined organic-free ZSM-18 to be available for exploration of potential catalytic applications.

Obviously, many other variations and modifications of this invention as previously set forth may be made without departing from the spirit and scope of this inventions as those skilled in the art readily understand. Such variations and modifications are considered part of this invention and within the purview and scope of the appended claims.

What is claimed is:

1. A method for removing a residue from an as-synthesized form of ZSM-18, resultant from an organic directing agent being 1,3,4,6,7,9-hexahydro-2,2,5,5,8,8-hexamethyl-2H-benzo [1,2C:3,4-C′:5,6C″] tripyrolium trihydroxide, said method comprising the steps of:
   a) impregnating a noble metal-containing precursor onto as-synthesized ZSM-18 in an amount sufficient to deposit a noble metal onto said ZSM-18 when reduced with hydrogen;
   b) reducing the as-synthesized ZSM-18 in hydrogen at a temperature of about 175° to 225° C. for about 0.5 to 2 hours thereby reducing said precursor to a free metal;
   c) calcining the ZSM-18 from step b) in air at about 275° to 325° for about 10 to 24 hours; and
   d) calcining said ZSM-18 from step c) at about 450° to about 550° C. in air for about 1 to 7 hours thereby removing said residue from said catalyst without suffering crystallinity loss.

2. The method as recited in claim 1 where the noble metal-containing precursor is tetraamineplatinum hydroxide.

3. The method as recited in claim 1 where in step a) the noble metal-containing precursor is tetraamineplatinum hydroxide where after reducing the hydrogen in step c) it is in an amount sufficient to place about 0.01 to about 0.20 wt. % of platinum on said ZSM-18.

4. The method as recited in claim 1 where in step b) the temperature is 200° C. to about 225° C.

5. The method as recited in claim 1 where in step c) the temperature is 300° C. to about 325° C.

6. The method as recited in claim 1 where in step d) the temperature is 500° C.

7. A method for preparing ZSM-18 which is essentially free of residual organic directing agent, said method comprising the steps of:
   (i) forming an aqueous reaction mixture capable of forming ZSM-18, said reaction mixture comprising a directing agent which is 1,3,4,6,7,9-hexahydro 2,2,5,5,8,8-hexamethyl-2H-benzo (1,2-C:-3,4-C′:5,6-C″) tripyrolium trihydroxide, a source of sodium cations, a source of silica and a source of alumina, said reaction mixture having a composition, expressed in terms of mole ratios of T and oxides, as follows:

| | |
|---|---|
| $SiO_2/Al_2O_3 =$ | 5–30 |
| $Na_2O/Al_2O_3 =$ | 0.2–5 |
| $H_2O/Al_2O_3 =$ | 200–1500 |
| $T/Al_2O_3 =$ | 1–10 | where T is said directing agent;
   (ii) placing within said reaction mixture a noble metal-containing precursor in an amount sufficient to occlude the noble metal on said ZSM-18 when reduced with hydrogen;
   (iii) maintaining said reaction mixture of step (i) under conditions sufficient to form crystals of ZSM-18;
   (iv) separating said ZSM-18 crystals from step (iii) from mother liquor of said reaction mixture by filtering and washing said crystals with water, whereby an as-synthesized form of ZSM-18 is obtained, said as-synthesized ZSM-18 having a residue of said organic directing agent in pores of said ZSM-18 and a noble metal-containing precursor occluded thereon;

(v) contacting said ZSM-18 from step (iv) with hydrogen under conditions sufficient to reduce noble metal contained in said precursor to a free metal;

(vi) calcining in air the ZSM-18 from step (v) with the noble metal thereon under conditions sufficient to substantially remove said residue; and (vii) calcining in air said ZSM-18 from step (vi) under conditions sufficient to remove any remaining residue from said ZSM-18 without suffering crystallinity loss.

8. The method as recited in claim 7 where in step (ii) said noble metal-containing precursor is tetraamineplatinum hydroxide.

9. The method as recited in claim 7 where in step (v) said precursor is tetraamineplatinum hydroxide and said free metal is platinum.

10. The method as recited in claim 7 where in step (v) a temperature of about 175° to 225° C. is used for about 0.5 to 2 hours.

11. The method as recited in claim 7 where after step (vii) said ZSM-18 substantially maintains its pore structure and its Alpha Value.

12. The method as recited in claim 7 where in step (vi) calcining is conducted at a temperature of about 275° to about 325° C. for about 10 to 24 hours.

13. The method as recited in claim 7 where in step (vii) calcining is conducted at a temperature of about 450° to about 550° C. for about 1 to 7 hours.

14. The method as recited in claim 1 where after step d) said ZSM-18 substantially maintains its pore structure and its Alpha Value.

15. The method as recited in claim 1 where in step a) the noble metal-containing precursor is selected from a member of the group consisting of palladiumtetraammonium chloride, rhodium acetate, and pentaamine chloroiridium (iii) dichloride.

16. The method as recited in claim 1 where in step a) the noble metal-containing precursor selected from a member of the group consisting of palladiumtetraammonium chloride, rhodium acetate, and pentaaminechloroiridium (iii) dichloride where upon reducing with hydrogen in step b) said noble metal is palladium, rhodium, and iridium respectively.

17. The method as recited in claim 7 where in step (ii) the noble metal-containing precursor is selected from a member of the group consisting of palladiumtetraammonium chloride, rhodium acetate, and pentaamine chloroiridium (iii) dichloride.

18. The method as recited in claim 7 where in step (ii) the noble metal-containing precursor is selected from a member of the group consisting of palladiumtetraammonium chloride, rhodium acetate, and pentaamine chloroiridium (iii) dichloride where upon reducing with hydrogen in step (v) said noble metal is palladium, rhodium, and iridium respectively.

19. A method for removing an organic residue from an as-synthesized form of ZSM-18, said method comprising the steps of:

a) impregnating a noble metal-containing precursor onto as-synthesized ZSM-18 in an amount sufficient to deposit a noble metal onto said ZSM-18 when reduced with hydrogen;

b) reducing the as-synthesized ZSM-18 in hydrogen at a temperature of about 175° to 225° C. for about 0.5 to 2 hours thereby reducing said precursor to a free metal;

c) calcining the ZSM-18 from step b) in air at about 275° to 325° for about 10 to 24 hours; and d) calcining said ZSM-18 from step c) at about 450° to about 550° C. in air for about 1 to 7 hours thereby removing said residue from said catalyst without suffering crystallinity loss.

* * * * *

UNITED STATES PATENT AND TRADEMARK OFFICE
CERTIFICATE OF CORRECTION

PATENT NO. : 5,290,534
DATED : March 1, 1994
INVENTOR(S) : Ying-Yen P. Tsao It is certified that error appears in the above-identified patent and that said Letters Patent is hereby corrected as shown below:

Column 10,

In claim 1, line 5, after 2, 4, and 6, insert -- - -- therefor.
Column 11,
In claim 15, lines 3 & 4, delete "palladiumtetraammonium Chloride and substitute --$Pd(NH_3)_4 Cl_2$--
Column 12,
In claims 16, 17 and 18, lines 3 & 4, delete " palladiumtetraammonium chloride and substitute --$Pd(NH_3)_4 Cl_2$--

Signed and Sealed this

Second Day of August, 1994

Attest:

BRUCE LEHMAN

*Attesting Officer*    *Commissioner of Patents and Trademarks*